United States Patent
Liao (10) Patent No.: US 11,653,286 B2
(45) Date of Patent: May 16, 2023

(54) METHODS OF MOBILE DEVICE BASED RELAY FOR COVERAGE EXTENSION

(71) Applicant: MEDIATEK INC., Hsin-Chu (TW)

(72) Inventor: Pei-Kai Liao, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 55 days.

(21) Appl. No.: 16/860,282

(22) Filed: Apr. 28, 2020

(65) Prior Publication Data

US 2020/0344708 A1 Oct. 29, 2020

Related U.S. Application Data

(60) Provisional application No. 62/839,823, filed on Apr. 29, 2019.

(51) Int. Cl.
*H04W 40/22* (2009.01)
*H04W 76/14* (2018.01)
(Continued)

(52) U.S. Cl.
CPC ........... *H04W 40/22* (2013.01); *H04W 8/005* (2013.01); *H04W 72/02* (2013.01); *H04W 72/23* (2023.01);
(Continued)

(58) Field of Classification Search
None
See application file for complete search history.

(56) References Cited

U.S. PATENT DOCUMENTS

2016/0212682 A1* 7/2016 Chung .................. H04W 12/06
2016/0212721 A1* 7/2016 Sheng .................. H04W 76/14
(Continued)

FOREIGN PATENT DOCUMENTS

CN 106162676 A 3/2015
CN 106304257 A 5/2015
(Continued)

OTHER PUBLICATIONS

3GPP TS 36.300 Version 15.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) *the whole document*.
(Continued)

*Primary Examiner* — Nicholas Sloms
(74) *Attorney, Agent, or Firm* — Imperium Patent Works; Zheng Jin (57) ABSTRACT

The invention discloses an equipment direct-through system relay state determination method and device. The method comprises the steps that relay user equipment UE acquires relay configuration information and/or receives device-to-device D2D information, and the relay state of the relay UE is determined according to the relay configuration information and/or the D2D information. The device is arranged in the relay user equipment UE and comprises an information acquisition module and a state determination module. According to the method and the device, the UE with the relay capacity can enter the relay second state without accessing of far-end users and enter the relay first state when receiving the request of the far-end users for searching the relay and periodically broadcast the relay information so that switching of the relay state of the relay UE can be realized through the mode, and the objective of power saving can be achieved when the relay UE is in the relay second state.

21 Claims, 7 Drawing Sheets

(51) Int. Cl.
  *H04W 72/02* (2009.01)
  *H04W 8/00* (2009.01)
  *H04W 72/23* (2023.01)
  *H04W 56/00* (2009.01)
  *H04W 88/04* (2009.01)
  *H04W 92/18* (2009.01)
  *H04W 92/10* (2009.01)

(52) U.S. Cl.
  CPC ........ *H04W 76/14* (2018.02); *H04W 56/0015* (2013.01); *H04W 88/04* (2013.01); *H04W 92/10* (2013.01); *H04W 92/18* (2013.01)

(56) References Cited

U.S. PATENT DOCUMENTS

| | | | |
|---|---|---|---|
| 2016/0353307 A1* | 12/2016 | Jung | H04W 24/10 |
| 2017/0048822 A1 | 2/2017 | Lee | |
| 2017/0126306 A1 | 5/2017 | Kim et al. | |
| 2017/0208638 A1 | 7/2017 | Baghel et al. | |
| 2018/0092017 A1 | 3/2018 | Freda | |
| 2018/0098370 A1 | 4/2018 | Bangolae et al. | |
| 2018/0152986 A1* | 5/2018 | Jung | H04W 76/27 |
| 2018/0220480 A1* | 8/2018 | Agiwal | H04W 8/005 |
| 2018/0287840 A1* | 10/2018 | Akkarakaran | H04L 27/2692 |
| 2018/0287866 A1 | 10/2018 | Yoon | |
| 2018/0324882 A1 | 11/2018 | Gulati et al. | |
| 2019/0182789 A1* | 6/2019 | Kim | H04W 76/14 |
| 2019/0335370 A1* | 10/2019 | Kumar | H04W 36/38 |
| 2019/0349951 A1* | 11/2019 | Ahmad | H04W 76/14 |
| 2019/0380120 A1 | 12/2019 | Nair | |
| 2019/0387429 A1* | 12/2019 | Basu Mallick | H04W 40/04 |
| 2020/0107381 A1* | 4/2020 | Ahmad | H04W 12/06 |
| 2020/0178343 A1* | 6/2020 | Kim | H04W 76/18 |
| 2020/0267799 A1 | 8/2020 | Lee | |
| 2020/0389900 A1 | 12/2020 | Lee | |

FOREIGN PATENT DOCUMENTS

| | | |
|---|---|---|
| WO | WO2016006859 A1 | 7/2014 |
| WO | WO2017159451 A1 | 3/2016 |

OTHER PUBLICATIONS

3GPP TS 36.300 Version 15.5.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) *the whole document*.

Nec, "On Necessary L1 Enhancements for UE-to-Network Relay", R1-151564 3GPP TSG RAN WG1 Meeting #80bis, Belgrade, Serbia, Apr. 20-24, 2015 (6 pages) *the whole document*.

International Search Report and Written Opinion of International Search Authority for PCT/CN2020/087751 dated Jul. 29, 2020 (9 pages).

R1-151564 3GPP TSG RAN WG1 Meeting #80bis, NEC, "On Necessary L1 Enhancements for UE-to-Network Relay", Belgrade, Serbia, Apr. 20-24, 2015 (6 pages) *section 2.2*.

R1-153278 3GPP TSG RAN WG1 Meeting #81, ITL, "Considerations on Relay UE Selection for UE-to Network Relays", Fukuoka, Japan, May 25-29, 2015 (3 pages) *the whole document*.

International Search Report and Written Opinion of International Search Authority for PCT/CN2020/087778 dated Aug. 5, 2020 (9 pages).

3GPP TS 36.300 V15.0.0 (Mar. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15) *sections 23.10-23.11*.

R2-151169 3GPP TSG RAN WG2 #89bis, ZTE, "Consideration on the UE-to-Network Relays", Bratislava, Slovakia, Apr. 20-24, 2015 (7 pages) *the whole document*.

China IPO, office action for the Chinese patent application 202080001893.5 (no English translation is available), dated Nov. 23, 2022 (15 pages).

R1-151564, 3GPP TSG RAN WG1 Meeting #80bis, On necessary L1 enhancements for UE-to-Network Relay, Section 2.2, dated Apr. 20-24, 2015 (6 pages).

The USPTO has prepared an Office Action for related U.S. Appl. No. 16/860,265, dated Dec. 8, 2022 (9 pages).

* cited by examiner

DEPLOYMENT SCENARIO #1

FIG. 3

DEPLOYMENT SCENARIO #2

METHODS OF MOBILE DEVICE BASED RELAY FOR COVERAGE EXTENSION

CROSS REFERENCE TO RELATED APPLICATIONS

This application claims priority under 35 U.S.C. § 119 from U.S. Provisional Application No. 62/839,823, entitled "Methods of Mobile Device based Relay for Coverage Extension," filed on Apr. 29, 2019, the subject matter of which is incorporated herein by reference.

TECHNICAL FIELD

The disclosed embodiments relate generally to wireless network communications, and, more particularly, to relay data traffic using PC5 link or sidelink for coverage extension in 5G new radio (NR) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. An established communication protocol such as LTE and 5G New Radio (NR) can be used over the licensed spectrum to provide a first communication link, and LTE/NR can also be used over the unlicensed spectrum to provide a second communication link. In New Radio-Unlicensed (NR-U), any downlink and uplink access have to follow the listen-before-talk (LBT) channel access procedure, as unlicensed frequencies are also used by other networks such as Wi-Fi.

There is big link budget gap for indoor UEs as compared to outdoor UEs. For outdoor UEs, there is no additional penetration loss, while for indoor UEs, there is outdoor-to-indoor penetration loss. As compared to Wi-Fi and NR unlicensed spectrum operation, a PC5 link (or sidelink) based mobile device potentially possesses the following features: 1) deployment by both operator can user; 2) operation in both unlicensed spectrum and licensed spectrum; 3) similar protocol stacks complexity to Wi-Fi; 4) better multiplexing efficiency than Wi-Fi; 5) better mobility support than Wi-Fi, e.g., service continuity; 6) larger maximal TX power than Wi-Fi for larger coverage: 7) support multi-hop relay.

A solution is sought to use UE as a mobile device relay using PC5 link or sidelink to relay data traffic to/from end UEs for coverage extension.

SUMMARY

A method to use UE as a mobile device relay using PC5 link or sidelink to relay data traffic to/from end UEs for coverage extension is proposed. A relay UE can be the group head UE of a UE relay group including one or more remote UEs. A remote UE can be in-coverage or out-of-coverage of the serving cell served by a serving base station. In a first novel aspect, the network is aware of remote UE existence. For example, remote UEs that are not connected to the network are still able to receive SIB, paging message, or RRC configuration from the network via PC5 link with the relay UE. In addition, methods for resource allocation and interference management are proposed. In a second novel aspect, solutions for synchronization of remote UEs on PC5 link, and solutions for connection setup between relay UE and remote UEs on PC5 link are proposed.

In one embodiment, a relay UE performs synchronization with a serving base station over a Uu link. The relay UE transmits synchronization signals and physical broadcast channel periodically to one or more remote UEs over sidelinks. The relay UE receives a connection request message from a remote UE over a corresponding sidelink. The relay UE transmits a connection response message to the remote UE such that a higher layer connection between the serving base station and the remote UE is established through the relay UE.

In another embodiment, a remote UE obtains a relay UE list that comprises one or more relay UEs for the remote UE to access a serving base station. The remote UE receives synchronization signals and physical broadcast channel transmitted from a relay UE over a sidelink. The remote UE transmits a connection request message to the one or more relay UEs in the relay UE list over corresponding sidelinks. The remote UE receives connection response messages from the one or more relay UEs such that a higher layer connection between the serving base station and the remote UE is established through a selected relay UE.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
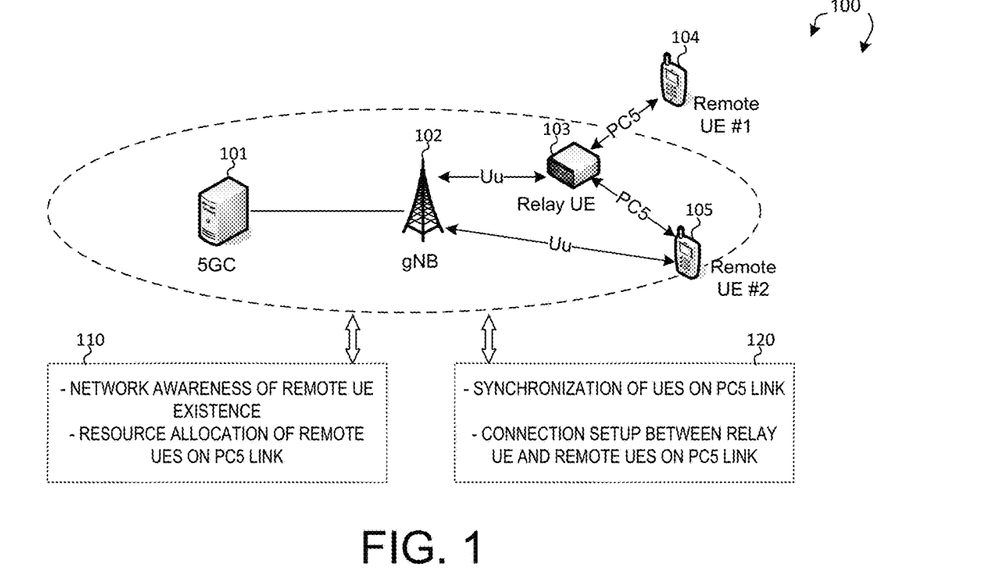
FIG. 1 illustrates a wireless communications system supporting PC5-based mobile device relay in accordance with a novel aspect.

FIG. 1 illustrates a wireless communications system 100 supporting PC5-based mobile device relay in accordance with a novel aspect. 5G new radio (NR) mobile communication network 100 comprises a 5G core (5GC) 101, a base station gNodeB 102, and a plurality of user equipments UE 103, UE 104, and UE 105. For in-coverage UEs, a base station can schedule the data traffic over Uu link. For out-of-coverage UEs, UE can schedule the data traffic over PC5 (or sidelink). In FIG. 1, UE 103 is a radio resource control (RRC)-connected UE that acts as a mobile device relay using PC5 (or sidelink) to relay data traffic to/from end remote UEs for coverage extension. Remote UE 104 is not connected to the network. Relay UE 103 helps to relay all data traffic for remote UE 104. Remote UE 105 is connected to the network via Uu link but the link quality may be poor. Relay UE 103 helps to relay part or all data traffic for remote UE 105.

In LTE and new radio (NR) networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI). The DCI format is a predefined format in which the downlink control information is formed and transmitted in PDCCH. Similarly, Physical Sidelink Control Channel (PSCCH) is used for sidelink (SL) scheduling of Physical Sidelink Shared Channel (PSSCH) transmission. The sidelink scheduling information carried by PSCCH is referred to as sidelink control information (SCI). SCI is transmitted over sidelink from TX UE to RX UE. The SCI format is a predefined format in which the sidelink control information is formed and transmitted in PSCCH. Both DCI format and SCI format give the UE scheduling details such as number of resource blocks, resource allocation type, modulation scheme, transport block, redundancy version, coding rate etc.

As compared to Wi-Fi and NR unlicensed spectrum operation, a PC5 link (or sidelink) based mobile device potentially possesses the following features: 1) deployment by both operator can user; 2) operation in both unlicensed spectrum and licensed spectrum; 3) similar protocol stacks complexity to Wi-Fi; 4) better multiplexing efficiency than Wi-Fi; 5) better mobility support than Wi-Fi, e.g., service continuity; 6) larger maximal TX power than Wi-Fi for larger coverage: 7) support multi-hop relay. In accordance with one novel aspect, a method to use UE as a mobile device relay using PC5 link or sidelink to relay data traffic to/from end UEs for coverage extension is proposed. In the example of FIG. 1, relay UE 103 helps to relay part or all data traffic for remote UE 104 and remote UE 105. In a first novel aspect, as depicted in 110, the network is aware of remote UE existence. For example, for remote UE 104 that is not connected to the network, it is able to receive SIB, paging message, or RRC configuration from the network via PC5 link. In addition, methods for resource allocation and interference management are proposed. In a second novel aspect, as depicted in 120, solutions for synchronization of UEs on PC5 link, and solutions for connection setup between relay UE and remote UEs on PC5 link are proposed.

Figure 2:
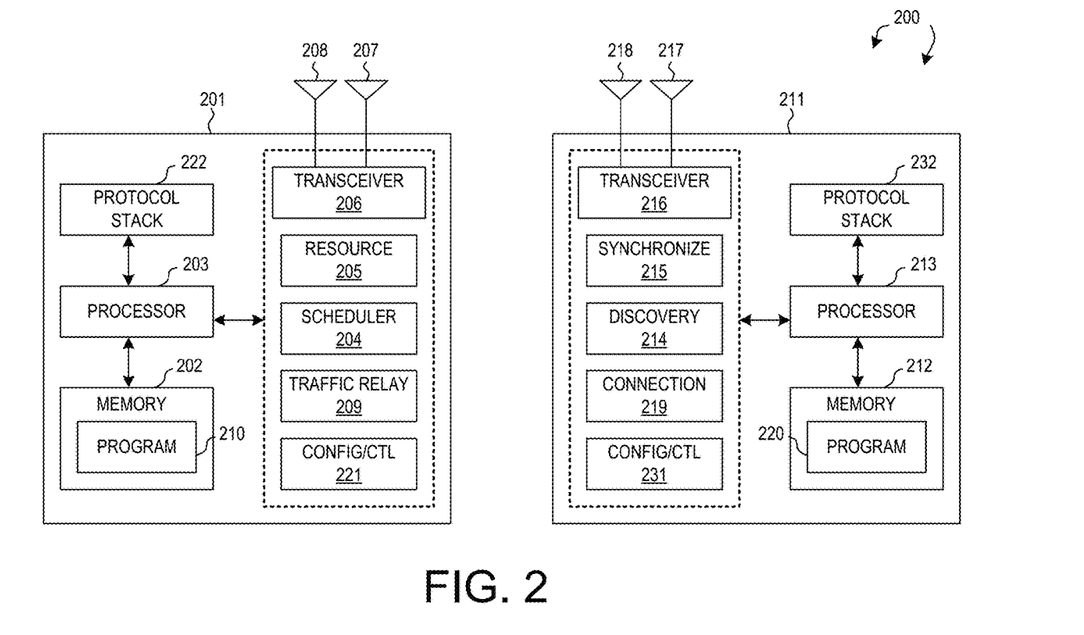
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station or a relay UE), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay UE that includes a protocol stack 222, a resource management circuit 205 for allocating sidelink resource pool, a scheduler 204 for scheduling sidelink radio resources, a traffic relay handling circuit 209 for relaying all or part of data traffic for remote UEs, and a control and configuration circuit 221 for providing control and configuration information. Wireless device 211 is a user equipment that includes a protocol stack 232, a synchronization handling circuit 215, a relay discovery circuit 214 for discovering relay UEs, a connection handling circuit 219 for establishing connection, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly.

In one example, a relay UE 201 forwards system information broadcast, paging message, and RRC configuration for PC5 link including resource pool configuration to remote UE 211. The relay UE 201 can also periodically transmit synchronization signals to remote UE 211. Relay UE 201 dynamically schedules radio resources within the resource pool configuration for data transmission to each remote UE or dynamically schedule radio resources within the resource pool configuration to be used by the remote UE 211 via scheduler 204. In another example, a remote UE 211 receives synchronization signals from relay UE 201 and performs synchronization via synchronization module 215, initiates a relay UE discovery procedure via discovery module 214, and establishes connection with a base station via connection module 219 through relay UE 201.

Figure 3:
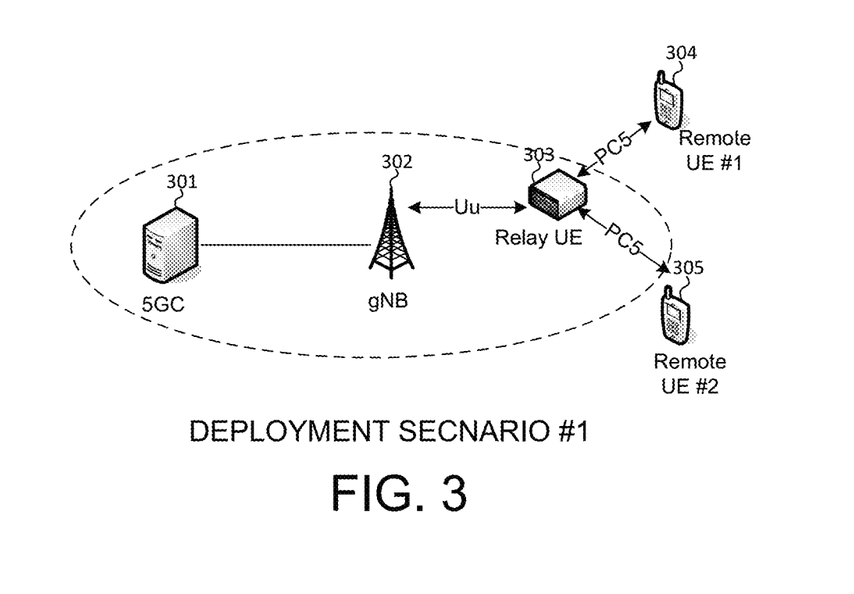
FIG. 3 illustrates a first deployment scenario for a PC5-based mobile device relay in accordance with one novel aspect.

FIG. 3 illustrates a first deployment scenario #1 for a PC5-based mobile device relay in accordance with one novel aspect. 5G new radio (NR) mobile communication network 300 comprises a 5G core (5GC) 501, a base station gNodeB 302, and a plurality of user equipments including UE 303, UE 304, and UE 305. For in-coverage UEs, a base station can schedule the data traffic over Uu link. For out-of-coverage UEs, UE can schedule the data traffic over PC5 (or sidelink). In the embodiment of FIG. 3, remote UE 304 and 305 are out-of-coverage. UE 303 is a radio resource control (RRC)-connected UE that acts as a relay UE using PC5 (or sidelink) to relay data traffic to/from end remote UE 304 and remote UE 305 for coverage extension. Only relay UE 303 is connected to the network via Uu link while remote UE 304 and remote UE 305 are not connected to the network. Relay UE 303 helps to relay all data traffic from the network to the remote UEs and from the remote UEs to the network via PC5 links.

Figure 4:
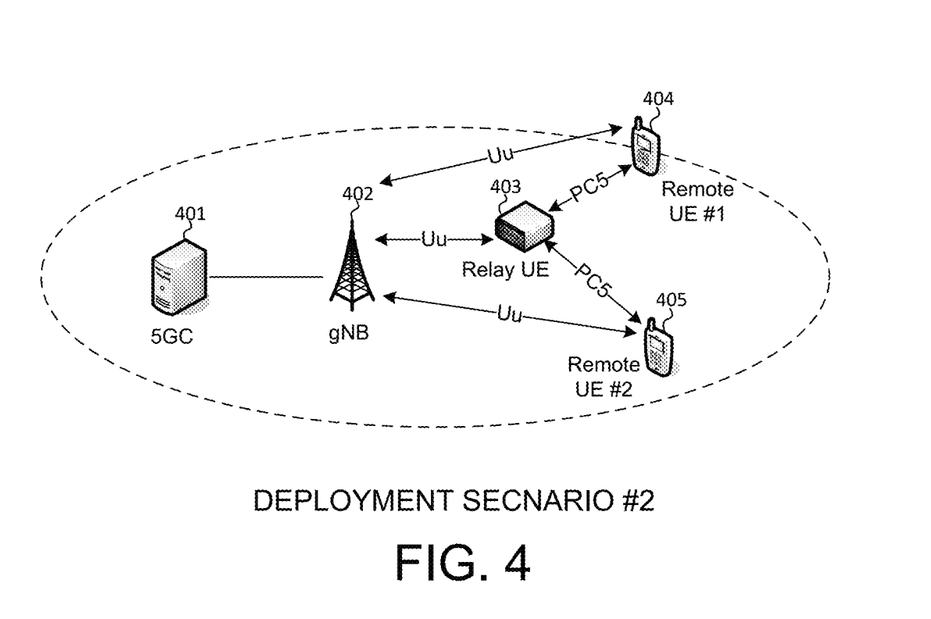
FIG. 4 illustrates a second deployment scenario for a PC5-based mobile device relay in accordance with one novel aspect.

FIG. 4 illustrates a second deployment scenario #2 for a PC5-based mobile device relay in accordance with one novel aspect. 5G new radio (NR) mobile communication network 500 comprises a 5G core (5GC) 401, a base station gNodeB 402, and a plurality of user equipments including UE 403, UE 404, and UE 405. For in-coverage UEs, a base station can schedule the data traffic over Uu link. For out-of-coverage UEs, UE can schedule the data traffic over PC5 (or sidelink). In the embodiment of FIG. 4, remote UE 404 and 405 are in-coverage. UE 403 is a radio resource control (RRC)-connected UE that acts as a relay UE using PC5 (or sidelink) to relay data traffic to/from end remote UE 404 and remote UE 405 for coverage extension. The relay UE 403 and remote UE 404 and 405 are all connected to the network via Uu link. But the link quality between the remote UEs and the network is worse than that between the relay UE and the network. Relay UE 403 helps to relay part or all data traffic from the network to the remote UEs and from the remote UEs to the network via PC5 links. The PC5 link can be in the same carrier as the Uu link or in a different carrier from the Uu link.

To support the deployment scenarios shown in FIG. 3 and FIG. 4, different issues are identified to enable PC5-based mobile device relay. The first issue is network awareness of remote UE's existence. The second issue is synchronization of remote UEs on PC5 link. The third issue is PC5 link connection setup between a relay UE and remote UEs. The fourth issue is resource allocation of remote UEs on PC5 link.

Figure 5:
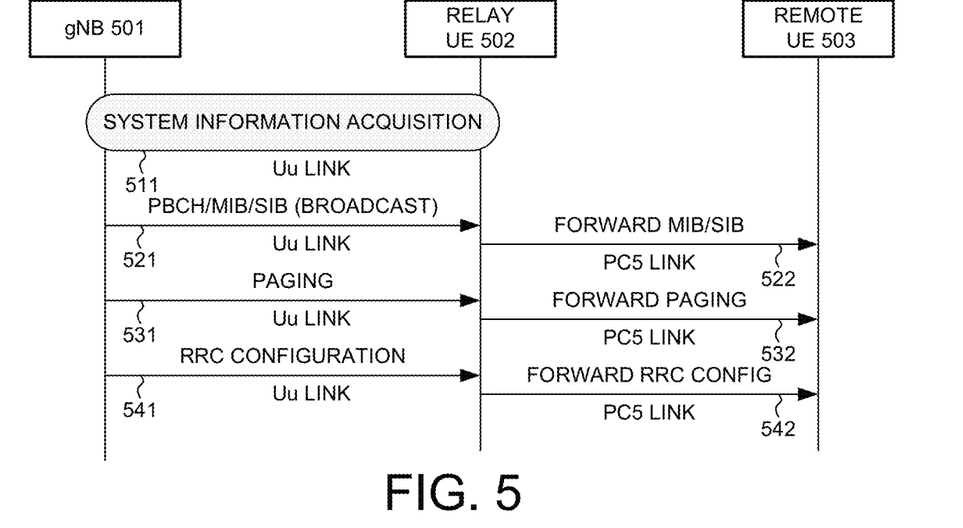
FIG. 5 illustrates a sequence flow between network and relay UE and remote UE with network-aware coverage extension.

FIG. 5 illustrates a sequence flow between network and relay UE and remote UE with network-aware coverage extension. To guarantee QoS, the network should be aware of the existence of end UEs and keep their UE context even though the remote UEs are out of network's coverage (e.g., the deployment scenario shown in FIG. 3). This means that the remote UEs are still connected to the network even when they do not have direct Uu link to the network. In the example of FIG. 5, system information acquisition (step 511) is usually the first step occurs between a serving base station gNB 501 and UEs including a relay UE 502 and a remote UE 503. When a remote UE does not have direct Uu link to the network and is connected to the network via a PC5 link, the remote UE should be able to receive information from the network via the PC5 link. Here, remote UE 503 does not have a direct Uu link to gNB 501, but is connected to the relay UE 502 via the PC5 link. As a result, remote UE 503 should be able to receive information from the network relayed by relay UE 502 over the PC5 link.

In a first example, in step 521, gNB 501 broadcasts MIB/SIB over a physical broadcast channel, and relay UE 502 forwards the MIB/SIB to remote UE 503 over PC5 link (step 522). In a second example, in step 531, gNB 501 sends a paging message to remote UE 503 via relay UE 502, which forwards the paging message to remote UE 503 over PC5 link (step 532). In a third example, in step 541, gNB 501 sends a UE-specific RRC configuration message to remote UE 503 via relay UE 502, which forwards the RRC configuration message to remote UE 503 over PC5 link (step 542). Remote UE 503 is able to receive RRC configuration for the RRC connection between the network and remote UE 503 from the network via the PC5 link. In one example, the RRC configuration includes radio resource allocation of sidelink resources to be used by UE 502 and UE 503 for sidelink transmissions. Note that a remote UE is required to synchronized with a relay UE when performing connection setup procedure. Thus, a remote UE (e.g., UE 503) is synchronized with a relay UE (e.g., UE 502) when receiving RRC configuration information and after the RRC connection setup.

Figure 6:
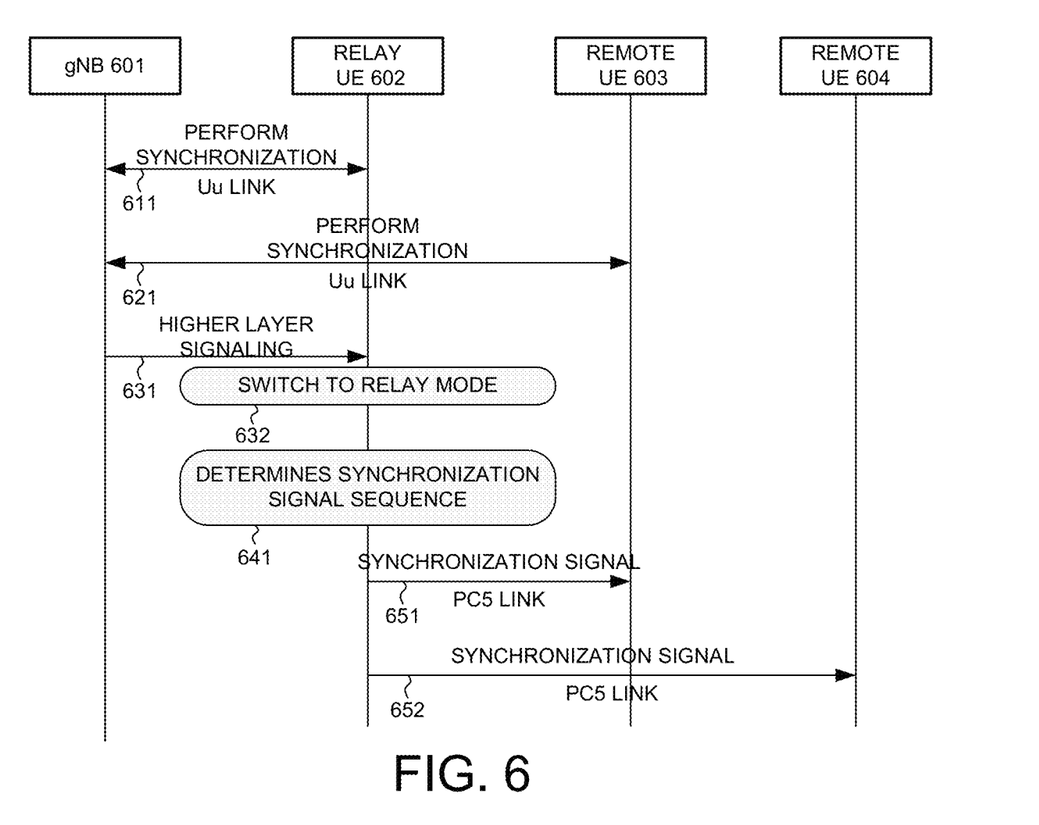
FIG. 6 illustrates a sequence flow between network and relay UE and remote UE for synchronization procedure over PC5 link.

FIG. 6 illustrates a sequence flow between network and relay UE and remote UE for synchronization procedure over PC5 link. A relay UE should transmit synchronization signals periodically so that remote UEs without network connection can utilize the transmitted synchronization signals for synchronization to enable broadcast message transmission capability. However, for remote UEs with network connection, they can synchronize with gNB via Uu link even though relay UE also provides synchronization signals. To avoid the same sequences for synchronization signals between nearby relay UEs, the sequences of synchronization signals transmitted by a relay UE should be based at least one of the following information: 1) Position related information of the relay UE, e.g. zone identification in LTE V2X; and 2) Layer-1 identification related information of the relay UE.

In the embodiment of FIG. 6, in step 611, UE 602 and UE 603 are in-coverage while UE 604 is out-of-coverage. In step 611, UE 602 performs synchronization with gNB 601 via Uu link. In step 621, UE 603 performs synchronization with gNB 601 via Uu link. In step 631, UE 602 is triggered by higher layer signaling from gNB 601 and switches to relay UE mode (step 632). Relay UE 602 needs to transmit synchronization signal and physical broadcast channel periodically over the PC5 link. However, remote UE 603 continues to synchronize with the network via the Uu link, even though remote UE 603 has a PC5 link with relay UE 602. The sequences of synchronization signals transmitted by relay UE 602 should be determined to avoid the same sequences for synchronization signals. In step 641, relay UE 602 determines the synchronization signal sequence. In step 651, relay UE 602 sends synchronization signal to remote UE 603 over PC5 link. In step 652, relay UE 602 sends synchronization signal to remote UE 604 over PC5 link. For remote UE 604, although it does not have connection to the network, it synchronizes with the target relay UE 602 over PC5 link.

Figure 7:
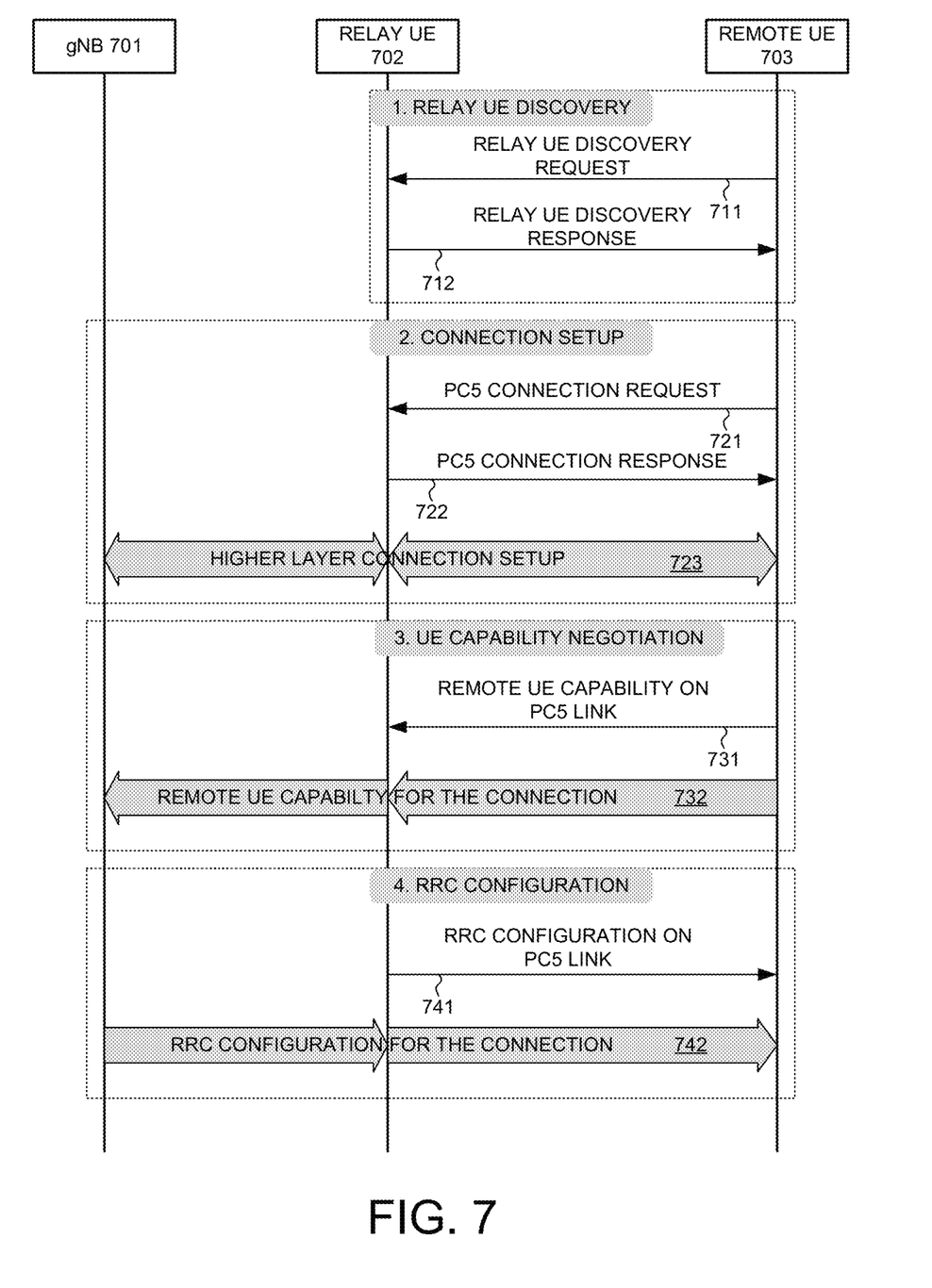
FIG. 7 illustrates a sequence flow of a connection setup procedure between the network and a remote UE via a relay UE.

FIG. 7 illustrates a sequence flow of a connection setup procedure between the network and a remote UE via a relay UE. When a remote UE moves to an area with weak or no Uu link to the network, the remote UE can initiate the connection setup procedure for the connection between the network and a remote UE via a relay UE based on a list of relay UEs, which may be obtained from: 1) user input, 2) historical search results via relay UE discovery procedure, and 3) network. FIG. 7 illustrates the connection setup procedure for the connection between the network gNB 701 and a remote UE 703 via a relay UE 702. The entire connection setup procedure comprises four parts: 1) Relay UE discovery, 2) Connection setup, 3) UE capability negotiation, and 4) RRC configuration. Note that if a remote UE detects one or more relay UEs nearby, it can synchronize with one of them and perform connection setup procedure directly, no need to perform relay UE discovery procedure. If a remote UE doesn't detect any relay UE nearby, it may perform discovery procedure based on the synchronization information it obtained from other ways, e.g., GPS, base station.

When a remote UE doesn't have any list of relay UEs for access, it can initiate a relay UE discovery procedure to find out nearby relay UEs that are able to provide services. In step 711, remote UE 703 transmits a relay UE discovery request message via broadcast message. The relay UE discovery request message carries at least one of the following information: 1) discovery request message type; 2) layer-1 identification of the initiating remote UE (UE 703), which allows a receiving relay UE (UE 702) to know which remote UE it should respond to; 3) reference signal for RSRP measurement, which enable a receiving relay UE to perform RSRP measurement and report the RSRP measurement results in the discovery response; 4) time window for the discovery response reception. The time window sets a time duration for a receiving relay UE to response. If no response is received, the remote UE can trigger new discovery request.

After receiving the relay UE discovery request message from remote UE 703, in step 712, relay UE 702 transmits a relay UE discovery response message within the time window for the discovery response via broadcast, groupcast, or unicast message. The UE discovery response message carries at least one of the following information when it is ready to provide services to a remote UE: 1) discovery response message type; 2) layer-1 identification of the initiating remote UE (UE 703), which allows an initiating remote UE to know whether the discovery response is meant to the remote UE; 3) layer-1 identification of the receiving relay UE (UE 702), which allows an initiating remote UE to know which relay UE transmits the connection response message; 4) RSRP measurement results, which allows an initiating remote UE to know the radio distance between the remote UE and the receiving relay UE.

When a remote UE already obtains a list of nearby relay UEs, the remote UE initiates a connection request procedure to find out the best relay UE to provide the connection. In step 721, the connection request message is transmitted by remote UE 703 via a broadcast message or groupcast message, which carries at least one of the following information: 1) connection request message type; 2) layer-1 identification of the initiating remote UE (UE 703), which allows a receiving relay UE to know which remote UE initiates the connection request; 3) layer-1 identification of the targeted relay UE(s) (UE 702)—one or more targeted relay UEs can be included, which allows a receiving relay UE to know whether the connection request is meant to the relay UE; 4) reference signal for RSRP measurement, which enables the receiving relay UE to perform RSRP measurement and report the RSRP measurement results in the connection response; 5) time window for the connection response reception.

After receiving the connection request message from remote UE 703, in step 722, the targeted relay UE 702 transmits the connection response within the time window for the connection response via broadcast, groupcast, or unicast message. The connection response message carries at least one of the following information when it is ready to provide services to a remote UE: 1) connection response message type; 2) layer-1 identification of the initiating remote UE (UE 703), which allows an initiating remote UE to know whether the connection response is meant to the remote UE, the identification is needed if using broadcast or groupcast message but not needed if using unicast message; 3) layer-1 identification of the receiving relay UE (UE 702), which allows an initiating remote UE to know which relay UE transmits the connection response message; 4) number of remote UEs served by the receiving relay UE, which allows an initiating remote UE to choose a relay UE with less connection load; 5) RSRP measurement results, which allows an initiating remote UE to know the radio distance between the remote UE and the receiving relay UE so that the remote UE can choose a relay UE with strongest signal strength.

In step 723, the higher-layer connection setup between the network and remote UE 703 via relay UE 702, which can be either combined with or separated from the connection request/response messages. The higher-layer RRC connection setup involves: 1) RRC connection setup for the link between gNB 701 and relay UE 702, including configurations for both PHY layer and higher layers; 2) RRC connection setup for the link between the relay UE 702 and the remote UE 703, including configuration at least for PHY layer and MAC layer; and 3) RRC connection setup for the link between gNB 701 and remote UE 703, including configurations for higher layers, e.g., RLC layer, PDCP layer, RRC layer. Step 1) should be ready once a UE becomes a relay UE, steps 2) and 3) are needed when a remote UE connects to gNB via the relay UE. The $2^{nd}$ and $3^{rd}$ steps can be combined together within single connection setup message or $2^{nd}$ step first and then followed by $3^{rd}$ step. In step 731, remote UE 703 sends remote UE capability to relay UE 702 on PC5 link. In step 732, UE capability negotiation occurs. In step 741, relay UE 702 sends RRC configuration to remote UE 703 on PC5 link. In step 742, RRC configuration for the established connection is sent to remote UE 703.

Figure 8:
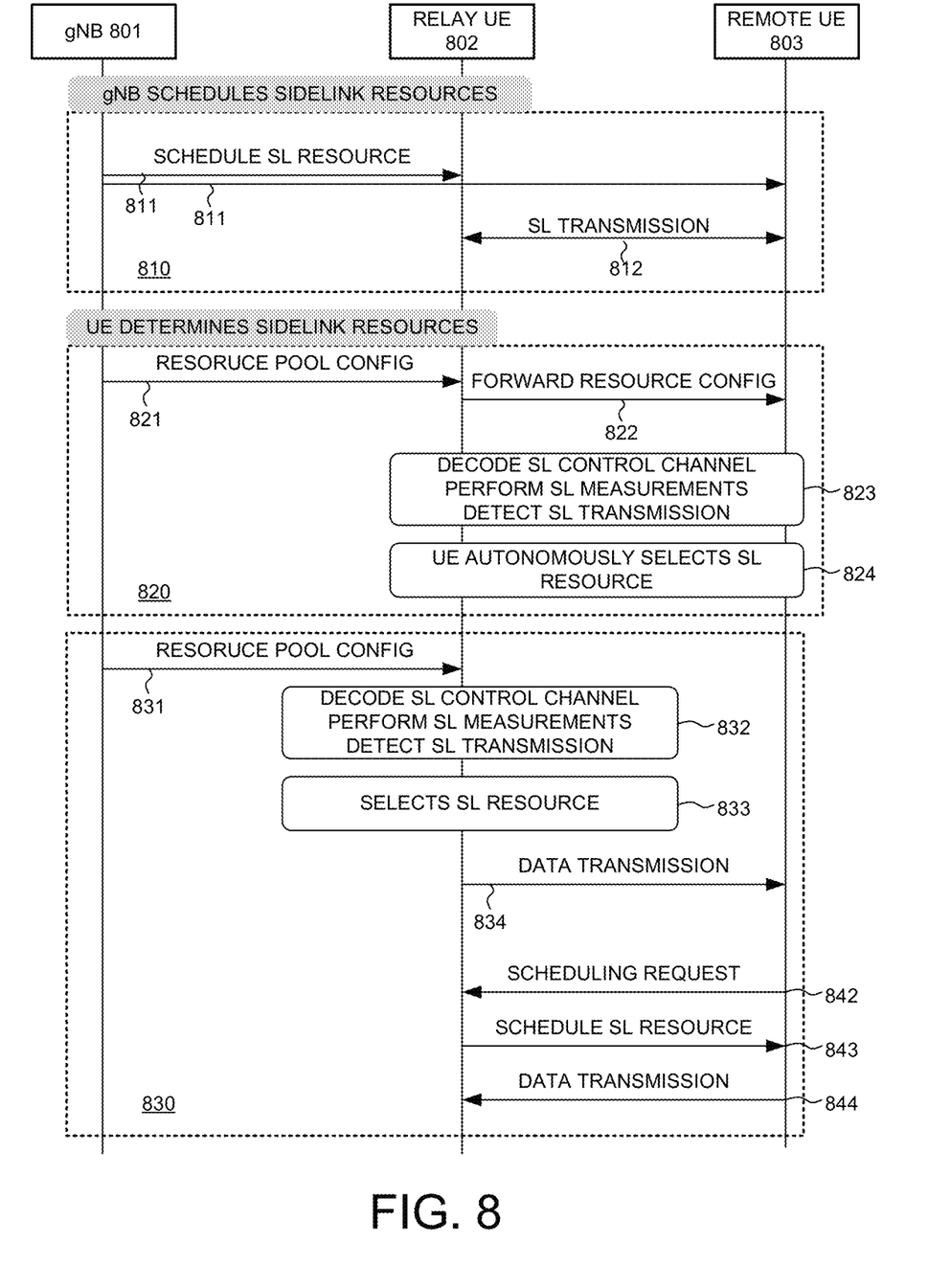
FIG. 8 illustrates a sequence flow between network and relay UE and remote UE for relay UE-based resource allocation.

FIG. 8 illustrates a sequence flow between network and relay UE and remote UE for relay UE-based resource allocation. In vehicle-to-everything (V2X) or device-to-device wireless communication systems, there are two resource allocation schemes. In a first scheme (mode #1), the base station schedules sidelink (SL) resources to be used by UE for SL transmission. This resource allocation mode #1 can be the baseline scheme for deployment scenario #2 in FIG. 4, where both relay UE and remote UEs are in-coverage so that the base station can have the full control for resource allocation. In a second scheme (mode #2), UE determines SL transmission resource within SL resources configured by the network or pre-configured SL resources.

This resource allocation mode #2 can be the baseline for deployment scenario #1 in FIG. 3, where the remote UEs are out-of-coverage.

Under mode #1, when both relay UE and remote UEs are in-coverage, base station can have full control for resource allocation of sidelink resources. As depicted by 810, in step 811, gNB 801 schedules SL resources for relay UE 802 and remote UE 803. In step 812, relay UE 802 and remote UE 803 communicate with each other over sidelink using the scheduled SL resources.

Under mode #2, UE determines sidelink resources, i.e., base station does not schedule SL transmission resources within SL resources configured by the network or pre-configured SL resources. The UE can apply various schemes for scheduling the SL resources. In a first scheme under mode #2, as depicted by 820, the relay or remote UE autonomously selects SL resources for data transmission. In step 821, eNB 801 provides resource pool configuration to a group head UE of a relay UE group. A relay UE group includes a relay UE and a group of remote UEs connected to the same relay UE via sidelink. The group head UE is the relay UE of the relay UE group. In a first alternative, the network provides single resource pool configuration to a relay UE group and each UE within the relay UE group shares the radio resources sharing for data traffic transmission. In a second alternative, the network provides a resource pool configuration to each UE within a relay UE group and each UE uses its corresponding resource pool configuration for data traffic transmission. In step 822, the relay UE 802 forward the resource pool configuration provided by the network to remote UE 803 within the relay UE group. In step 823, the relay or remote UE performs: 1) decoding to SL control channel transmissions; 2) SL measurements; and 3) detection of SL transmissions. In step 824, the relay or remote UE dynamically selects the radio resources within the resource pool configuration for the data traffic transmission to another UE based on step 823.

In a second scheme under mode #2, as depicted by 830, the relay UE selects SL resources for data transmission of other UEs in the relay UE group. The network provides resource pool configuration and/or individual resource configuration to each UE with a UE group via a group head UE. The group head UE cannot modify the configuration provided by the network. Other than the group head UE, other UEs within the relay UE group do not have direct Uu link to the network. Therefore, for better multiplexing efficiency within the remote UE connecting to the same relay UE, the relay UE should be allowed to dynamically schedule the remote UEs. Considering interference management between different relay UE groups, the resource allocation between different relay UE groups should be managed by the network.

In step 831, eNB 801 provides resource pool configuration to a group head UE (relay UE 802) of a relay UE group. In step 832, the relay UE 802 performs: 1) decoding to SL control channel transmissions; 2) SL measurements; and 3) detection of SL transmissions. When the relay UE 802 transmits data traffic to each remote UE within the relay UE group, in step 833, it dynamically selects the radio resources within the resource pool configuration for the data traffic transmission to each remote UE based on step 822. In step 834, relay UE 802 transmits data to remote UE 803 using the selected radio resources. When the remote UE 803 within the relay UE group has data traffic to transmit to the relay UE 802, remote UE 803 first sends a scheduling request to relay UE 802 (step 842), and receives a scheduling of SL resource from relay UE 802 (step 843), and remote UE 803 selects the radio resources within the resource pool for the data traffic transmission to the relay UE 802 based on the relay UE's dynamic scheduling (step 844). Note that UE can assist SL resource selection for other UEs for data transmission over sidelinks.

Figure 9:
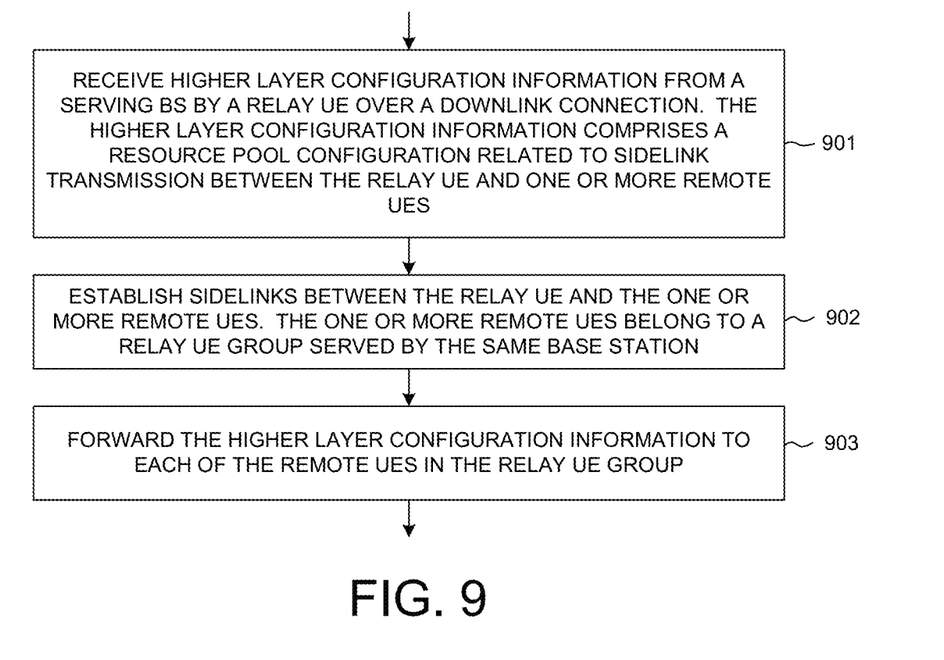
FIG. 9 is a flow chart of a method of coverage extension and resource allocation from relay UE perspective in accordance with one novel aspect.

FIG. 9 is a flow chart of a method of coverage extension and resource allocation from relay UE perspective in accordance with one novel aspect. In step 901, a relay UE receives higher layer configuration information from a serving base station over a downlink connection. The higher layer configuration information comprises a resource pool configuration related to sidelink transmissions between the relay UE and one or more remote UEs. In step 902, the relay UE establishes sidelinks with the relay UE and the one or more remote UEs. The one or more remote UEs belong to a relay UE group served by the same base station. In step 903, the relay UE forwards the higher layer configuration information to each of the remote UEs in the relay UE group.

Figure 10:
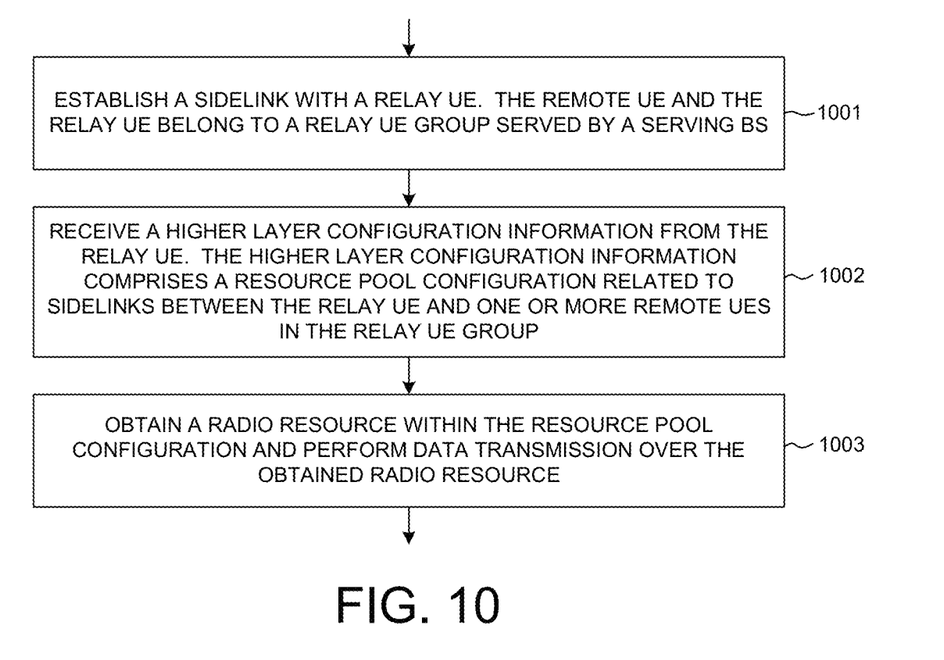
FIG. 10 is a flow chart of a method of coverage extension and resource allocation from remote UE perspective in accordance with one novel aspect.

FIG. 10 is a flow chart of a method of coverage extension and resource allocation from remote UE perspective in accordance with one novel aspect. In step 1001, a remote UE establishes a sidelink with a relay UE. The remote UE and the relay UE belong to a relay UE group served by a serving base station. In step 1002, the remote UE receives higher layer configuration information from the relay UE. The higher layer configuration information comprises a resource pool configuration related to sidelinks between different the relay UE and one or more remote UEs in the relay UE group. In step 1003, the remote UE obtains a radio resource within the resource pool configuration and performing data transmission over the obtained radio resource.

Figure 11:
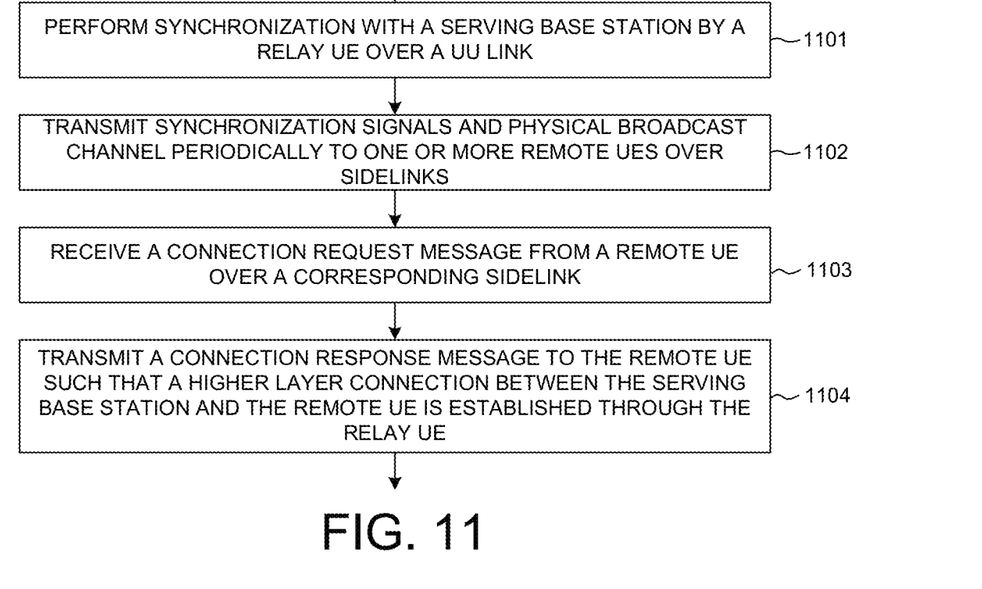
FIG. 11 is a flow chart of a method of coverage extension and connection setup from relay UE perspective in accordance with one novel aspect.

FIG. 11 is a flow chart of a method of coverage extension and connection setup from relay UE perspective in accordance with one novel aspect. In step 1101, a relay UE performs synchronization with a serving base station over a Uu link. In step 1102, the relay UE transmits synchronization signals and physical broadcast channel periodically to one or more remote UEs over sidelinks. In step 1103, the relay UE receives a connection request message from a remote UE over a corresponding sidelink. In step 1104, the relay UE transmits a connection response message to the remote UE such that a higher layer connection between the serving base station and the remote UE is established through the relay UE.

Figure 12:
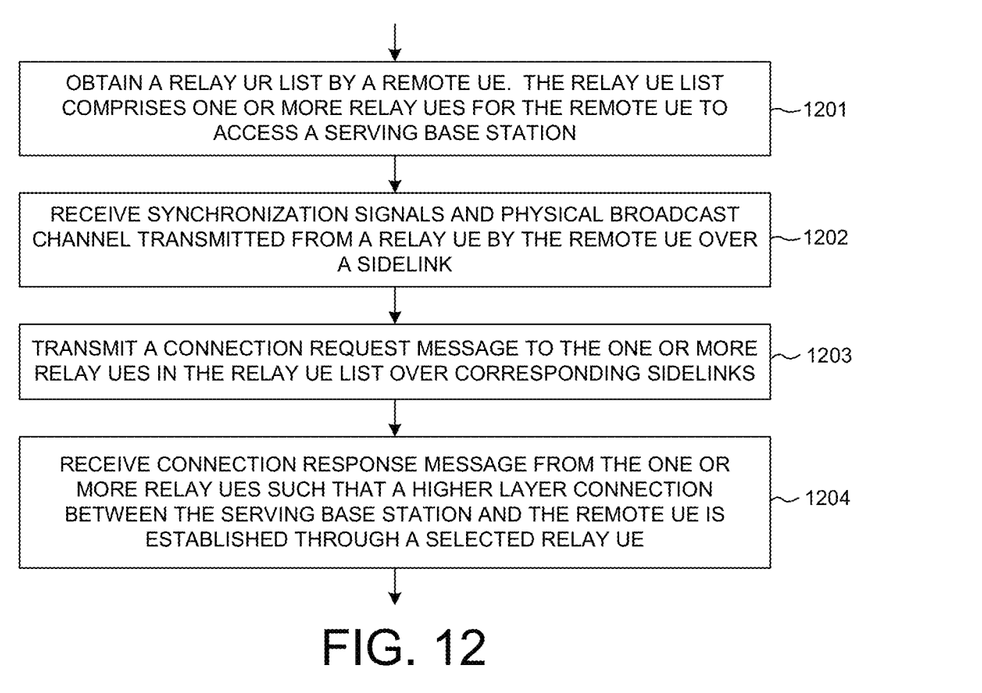
FIG. 12 is a flow chart of a method of coverage extension and connection setup from remote UE perspective in accordance with one novel aspect.

FIG. 12 is a flow chart of a method of coverage extension and connection setup from remote UE perspective in accordance with one novel aspect. In step 1201, a remote UE obtains a relay UE list that comprises one or more relay UEs for the remote UE to access a serving base station. In step 1202, the remote UE receives synchronization signals and physical broadcast channel transmitted from a relay UE over a sidelink. In step 1203, the remote UE transmits a connection request message to the one or more relay UEs in the relay UE list over corresponding sidelinks. In step 1204, the remote UE receives connection response messages from the one or more relay UEs such that a higher layer connection between the serving base station and the remote UE is established through a selected relay UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
performing synchronization with a serving base station by a relay user equipment (UE) over a Uu link,
transmitting synchronization signals and physical broadcast channel periodically to one or more remote UEs over sidelinks, wherein the synchronization signals comprise sequences that are determined by the relay UE based on at least one of zone identification related information of the relay UE and Layer-1 identification related information of the relay UE;
receiving a connection request message from a remote UE over a corresponding sidelink, wherein the connection request message comprises a reference signal for RSRP measurement; and
transmitting a connection response message to the remote UE such that a higher layer connection between the serving base station and the remote UE is established through the relay UE, wherein the connection response message comprises a number of remote UEs served by the relay UE and RSRP measurement results.

2. The method of claim 1, wherein the relay UE switches to a relay UE mode upon receiving a higher layer signaling from the serving base station.

3. The method of claim 1, wherein the connection request message comprises at least one of a connection request message type, a Layer-1 identification of the remote UE, a Layer-1 identification of the relay UE, and a time window for a connection response reception.

4. The method of claim 1, wherein the connection response message comprises at least one of a connection response message type, a Layer-1 identification of the remote UE, and a Layer-1 identification of the relay UE.

5. The method of claim 1, further comprising:
receiving a relay UE discovery message from the remote UE; and
transmitting a relay UE discovery response message to the remote UE.

6. The method of claim 5, wherein the relay UE discovery request message comprises at least one of a discovery request message type, a Layer-1 identification of the remote UE, a reference signal for RSRP measurement, and a time window for a discovery response reception.

7. The method of claim 5, wherein the relay UE discovery response message comprises at least one of a discovery response message type, a Layer-1 identification of the remote UE, a Layer-1 identification of the relay UE, and RSRP measurement results.

8. A method comprising:
obtaining a relay user equipment (UE) list by a remote UE, wherein the relay UE list comprises one or more relay UEs for the remote UE to access a serving base station;
receiving synchronization signals and physical broadcast channel transmitted from a relay UE by the remote UE over a sidelink, wherein the synchronization signals comprise sequences that are determined by the relay UE based on at least one of zone identification related information of the one or more relay UEs and Layer-1 identification related information of the one or more relay UEs;
transmitting a connection request message to the one or more relay UEs in the relay UE list over corresponding sidelinks, wherein the connection request message comprises a reference signal for RSRP measurement; and
receiving connection response messages from the one or more relay UEs such that a higher layer connection between the serving base station and the remote UE is established through a selected relay UE, wherein each connection response message comprises a number of remote UEs served by the relay UE and RSRP measurement results.

9. The method of claim 8, wherein the one or more relay UEs are obtained from a relay UE discovery procedure involving:
broadcasting a relay UE discovery message from the remote UE; and
receiving a relay UE discovery response message from the one or more relay UEs.

10. The method of claim 9, wherein the relay UE discovery request message comprises at least one of a discovery request message type, a Layer-1 identification of the remote UE, a reference signal for RSRP measurement, and a time window for a discovery response reception.

11. The method of claim 9, wherein the relay UE discovery response message comprises at least one of a discovery response message type, a Layer-1 identification of the remote UE, a Layer-1 identification of a receiving relay UE, and RSRP measurement results.

12. The method of claim 8, wherein the connection request message comprises at least one of a connection request message type, a Layer-1 identification of the remote UE, a Layer-1 identification of a target relay UE, and a time window for a connection response reception.

13. The method of claim 8, wherein each connection response message comprises at least one of a connection response message type, a Layer-1 identification of the remote UE, and a Layer-1 identification of a receiving relay UE.

14. The method of claim 8, wherein the remote UE selects the relay UE from the one or more relay UEs based on the RSRP measurement results in the connection response messages.

15. A Remote User Equipment (UE) comprising:
a discovery circuit that obtains a relay UE list by the remote UE, wherein the relay UE list comprises one or more relay UEs for the remote UE to access a serving base station;
a receiver that receives synchronization signals and physical broadcast channel from a relay UE by the remote UE over a sidelink, wherein the synchronization signals comprise sequences that are determined by the relay UE based on at least one of zone identification related information of the one or more relay UEs and Layer-1 identification related information of the one or more relay UEs;
a transmitter that transmits a connection request message to the one or more relay UEs in the relay UE list over corresponding sidelinks, wherein the connection request message comprises a reference signal for RSRP measurement; and
a connection handling circuit that establishes a higher layer connection with the serving base station through a selected relay UE upon receiving connection response messages from the one or more relay UEs, wherein each connection response message comprises a number of remote UEs served by the relay UE and RSRP measurement results.

16. The UE of claim 15, wherein the one or more relay UEs are obtained from a relay UE discovery procedure involving:

broadcasting a relay UE discovery message from the remote UE; and receiving a relay UE discovery response message from the one or more relay UEs.

17. The UE of claim 15, wherein the relay UE discovery request message comprises at least one of a discovery request message type, a Layer-1 identification of the remote UE, a reference signal for RSRP measurement, and a time window for a discovery response reception.

18. The UE of claim 15, wherein the relay UE discovery response message comprises at least one of a discovery response message type, a Layer-1 identification of the remote UE, a Layer-1 identification of a receiving relay UE, and RSRP measurement results.

19. The UE of claim 15, wherein the connection request message comprises at least one of a connection request message type, a Layer-1 identification of the remote UE, a Layer-1 identification of a target relay UE, and a time window for a connection response reception.

20. The UE of claim 15, wherein each connection response message comprises at least one of a connection response message type, a Layer-1 identification of the remote UE, and a Layer-1 identification of a receiving relay UE.

21. The UE of claim 15, wherein the remote UE selects the relay UE from the one or more relay UEs based on the RSRP measurement results in the connection response messages.

* * * * *